(12) United States Patent
Pomeroy

(10) Patent No.: US 8,872,894 B2
(45) Date of Patent: Oct. 28, 2014

(54) STEREOSCOPIC VIDEO TRANSCODER AND METHODS FOR USE THEREWITH

(75) Inventor: John Pomeroy, Markham (CA)

(73) Assignee: ViXS Systems, Inc., Toronto, Ontario (CA)

( * ) Notice: Subject to any disclaimer, the term of this patent is extended or adjusted under 35 U.S.C. 154(b) by 351 days.

(21) Appl. No.: 13/178,372

(22) Filed: Jul. 7, 2011

(65) Prior Publication Data
US 2013/0010058 A1 Jan. 10, 2013

(51) Int. Cl.
*H04N 13/00* (2006.01)

(52) U.S. Cl.
CPC ....... *H04N 13/0029* (2013.01); *H04N 13/0048* (2013.01)
USPC .......................................................... 348/43

(58) Field of Classification Search
None
See application file for complete search history.

(56) References Cited

U.S. PATENT DOCUMENTS

| 2011/0064220 A1* | 3/2011 | Chen et al. ..................... 380/217 |
| 2011/0149029 A1* | 6/2011 | Kellerman et al. ............. 348/43 |

* cited by examiner

*Primary Examiner* — Sath V Perungavoor
*Assistant Examiner* — Kate Luo
(74) *Attorney, Agent, or Firm* — Garlick & Markison; Bruce E. Stuckman

(57) ABSTRACT

A video transcoder includes a deformatting module that generates a deformatted video signal based on a video signal in a source stereoscopic video format, and further based on device data that corresponds to a particular target device. A scaling module generates a scaled video signal, based on the deformatted video signal and further based on the device data. A formatting module generates a reformatted video signal in accordance with a target video format, based on the scaled video signal and further based on the device data.

10 Claims, 9 Drawing Sheets

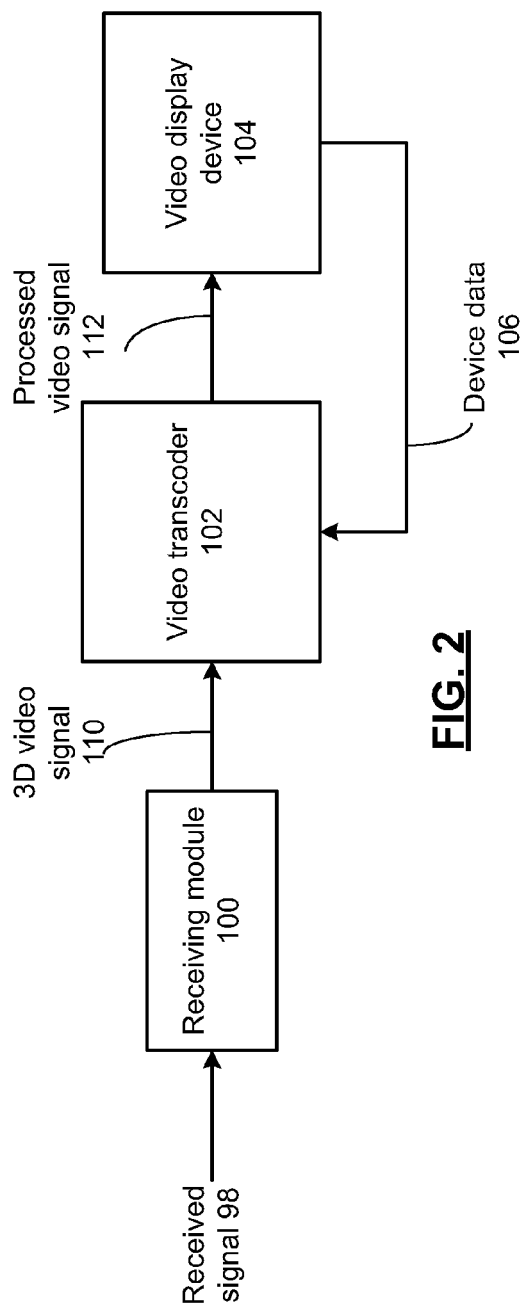
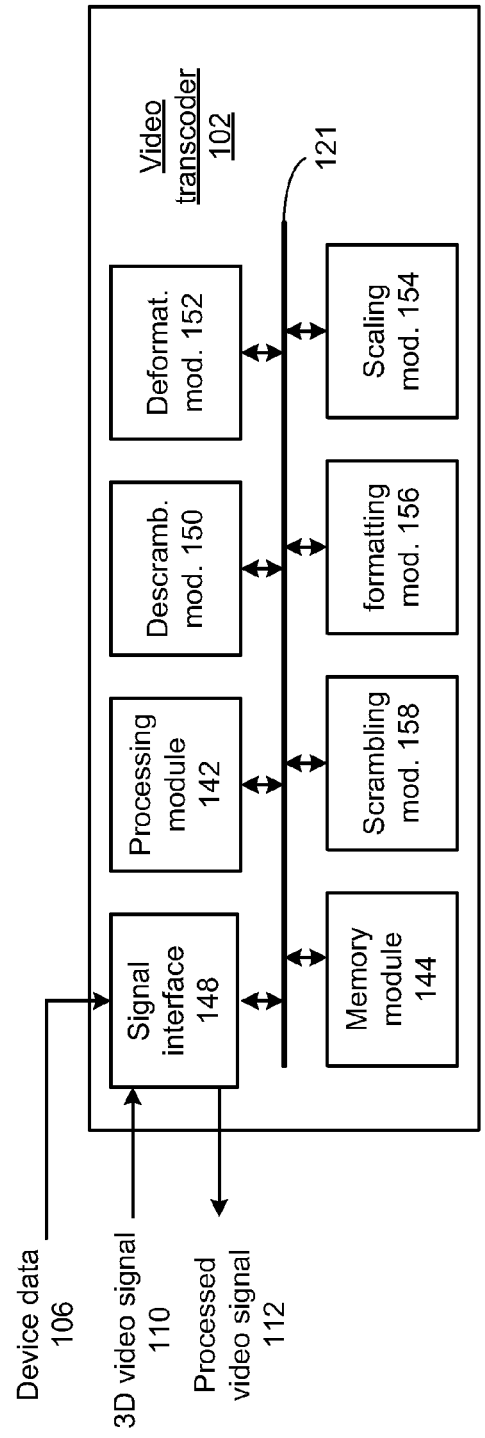

US 8,872,894 B2

STEREOSCOPIC VIDEO TRANSCODER AND METHODS FOR USE THEREWITH

CROSS REFERENCE TO RELATED PATENTS not applicable

TECHNICAL FIELD OF THE INVENTION

The present invention relates to coding used in devices such as video transcoders for video signals.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. The video signal encoded by these encoding methods must be similarly decoded for playback on most video display devices.

A recent trend in video encoding and playback is the proliferation of three-dimensional (3D) video devices that process or playback stereoscopic video signals to the user. For example, the Motion Picture Expert Group (MPEG) has presented an multi-view video coding (MVC) extension of MPEG-4, part 10, or advanced video coding (AVC). MVC provides frame sequential coding of high resolution right and left views of video content at an enhanced video frame rate such as 100 frames per second or 120 frames per second.

Not all devices support the playback of 3D video signals or use the same 3D format. Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 2 presents a block diagram representation of a video system in accordance with an embodiment of the present invention.

FIG. 3 presents a block diagram representation of a video transcoder 102 in accordance with an embodiment of the present invention.

DETAILED DESCRIPTION OF THE INVENTION INCLUDING THE PRESENTLY PREFERRED EMBODIMENTS

Figure 1:
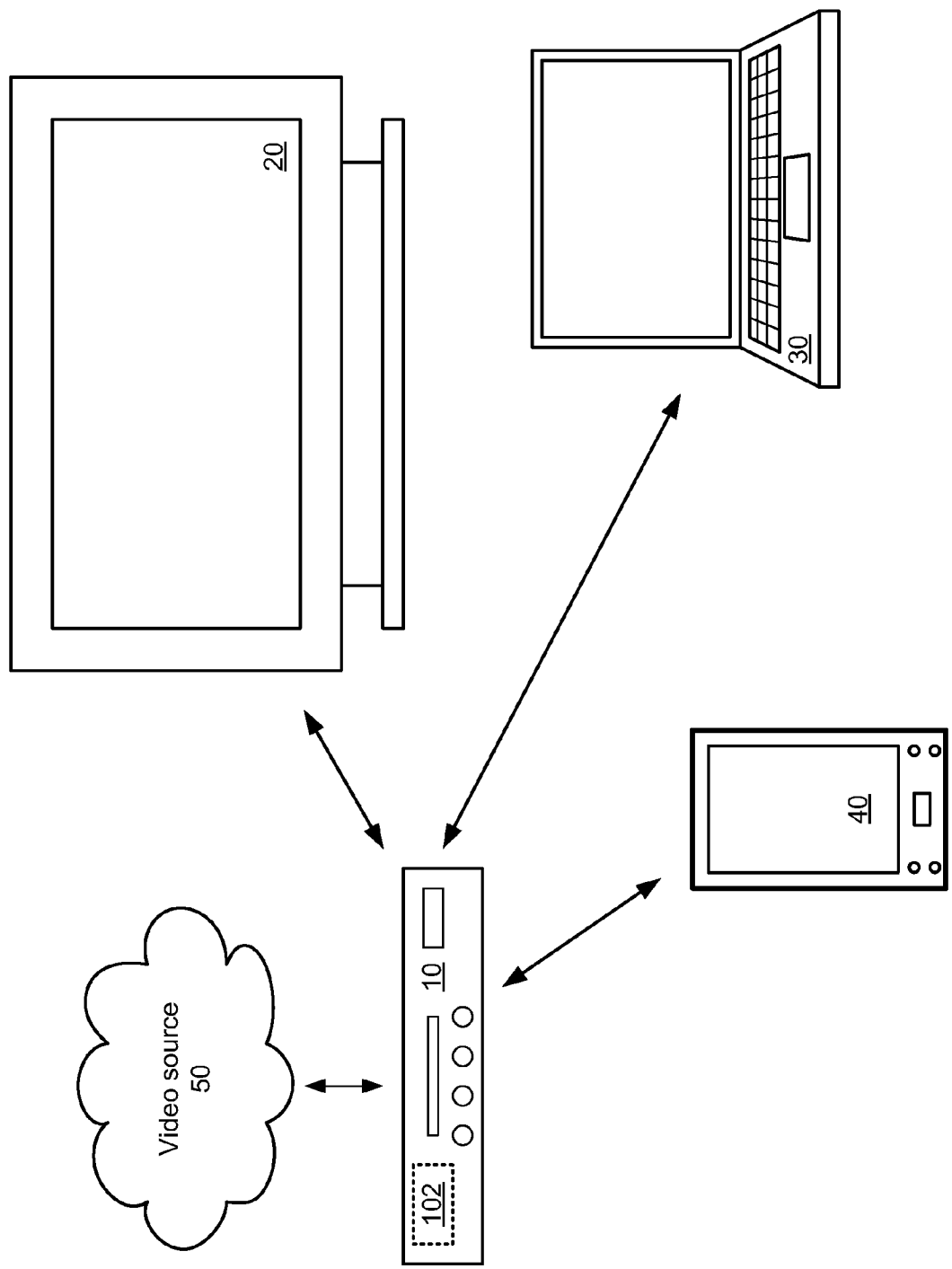
FIG. 1 presents a pictorial diagram representation of a video distribution system in accordance with an embodiment of the present invention.

FIG. 1 presents a pictorial diagram representation of a video distribution system in accordance with an embodiment of the present invention. In particular, video processing device 10, such as a set top box with built-in digital video recorder functionality or a stand alone digital video recorder, gateway, head end, video server or other video processing device that receives a 3D video from a video source 50. The video processing device 10 includes a transcoder 102 that transcodes the 3D video signal for playback by a video display device such as a television or monitor 20, and portable computer 30 or mobile video player 40.

While particular devices are illustrated, the present invention can be implemented in any device or system that is capable of transcoding video content in accordance with the methods and systems described in conjunction with FIGS. 2-15 and the appended claims.

FIG. 2 presents a block diagram representation of a video system in accordance with an embodiment of the present invention. In particular, this video system, such as video device 10 includes a receiving module 100, such as a network card, television receiver, cable television receiver, satellite broadcast receiver, broadband modem, 3G transceiver or other information receiver or transceiver that is capable of receiving a received signal 98 and generating a 3D video signal 110 that has been encoded via a stereoscopic video encoding format. Video transcoder 102 is coupled to the receiving module 100 to transcode the 3D video signal 110 into a processed video signal 112 for transmission, storage, editing, and/or playback in a target video format corresponding to video display device 104. Video display device 104 can include a television or monitor 20, and portable computer 30 or mobile video player 40, such as a smart phone or other portable video player, or other video display device. While shown as a separate from video display device 104, video transcoder 102 can be incorporated in the video display device 104, such television or monitor 20 and portable computer 30, receiving module 100 or other device In an embodiment of the present invention, the received signal 98 is a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, or solid state memory and can include a streaming video signal that is transmitted over a public or private network such as a local area network, wide area network, metropolitan area network or the Internet.

Video signal 110 is formatted in accordance with a source stereoscopic video format that includes a 3D transport format and accompanying video compression format. One example of such a 3D transport format includes a two-dimensional (2D) plus depth format that uses a two dimensional image and separate depth information. Another example of such a 3D transport format includes a 3D frame composite format such as a side-by-side, top-and-bottom, line interleaved or checkerboard interleaved format that presents right and left video pictures in a single composite video frame. A further example of such a 3D transport format includes a 3D frame sequential format such as a Blu-ray 3D, Dolby 3D, MVC, etc. Examples of corresponding video compression formats include MPEG-4, MPEG-4 AVC, Scalable Video Coding (SVC) Annex G extension to H.264/MPEG-4 AVC, MPEG2, Quicktime, Real Media, Windows Media Video (WMV) or Audio Video Interleave (AVI), video coding one (VC-1), JPEG2000, etc.

In operation, transcoder 102 operates based on device data 106 corresponding to a particular target device, such as video display device 104 to transcode the 3D video signal 110 from the source stereoscopic video format to a processed video signal 112 in a target video format of the video display device 104. In this fashion, transcoder 102 can transcode 3D video signal 110 from a particular 3D transport format into a 2D video format or another 3D transport format, while optionally scaling the video to a different frame rate or resolution or modifying the video compression format from a source compression format of 3D video signal 110 to a different video compression format compatible with the video display device 104. Further, the transcoder 102 can transcode 3D video signal 110 to optionally scale the video to a different resolution while maintaining the 3D transport format.

In the alternative to operating based on device data 106, transcoder 102 can operated based a fixed set of rules, defined and preset by the system manufacturer, based on manual configuration data set by the user via a user interface or based on additional configuration data, internal software or firmware to transcode the 3D video signal 110 from the source stereoscopic video format to a processed video signal 112 in a target video format of the video display device 104.

FIG. 3 presents a block diagram representation of a video transcoder 102 in accordance with an embodiment of the present invention. In particular, video transcoder 102 receives device data 106 from a particular target device, such as the video display device 104, or from a database or another source that correlates the device data 106 with the particular target device. In operation, the video transcoder 102 transcodes a 3D video signal 110 into processed video signal 112 based on device data 106 of the particular target device, in order to match the format required by or best suited for the particular target device.

Video transcoder 102 includes a signal interface 148, processing module 142, memory module 144, descrambling module 150, deformatting module 152, scaling module 154, formatting module 156 and scrambling module 158 that are coupled via bus 121. While a particular bus architecture is shown, other architectures that include two or more data buses or direct connectivity between modules can likewise be implemented.

The processing module 142 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 144. This memory may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module 142 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

The signal interface 148 receives 3D video signal 110 and optionally buffers and preprocesses the video signal for processing by the other modules of the video transcoder 102. Similarly, the video signals generated via processing by the other modules of video transcoder 102 is optionally buffered, such as via a ring buffer or other buffer structure implemented in conjunction with memory locations of memory module 144 and formatted for output as processed video signal 112. Descrambling module 150, deformatting module 152, scaling module 154, formatting module 156 and scrambling module 158 can each be implemented as a separate hardware engine or processing device or be implemented via either software or firmware stored in memory module 144 and executed by processing module 142. The further operation of descrambling module 150, deformatting module 152, scaling module 154, formatting module 156 and scrambling module 158, including several optional functions and features will be discussed in greater detail in conjunction with FIG. 4.

Figure 4:
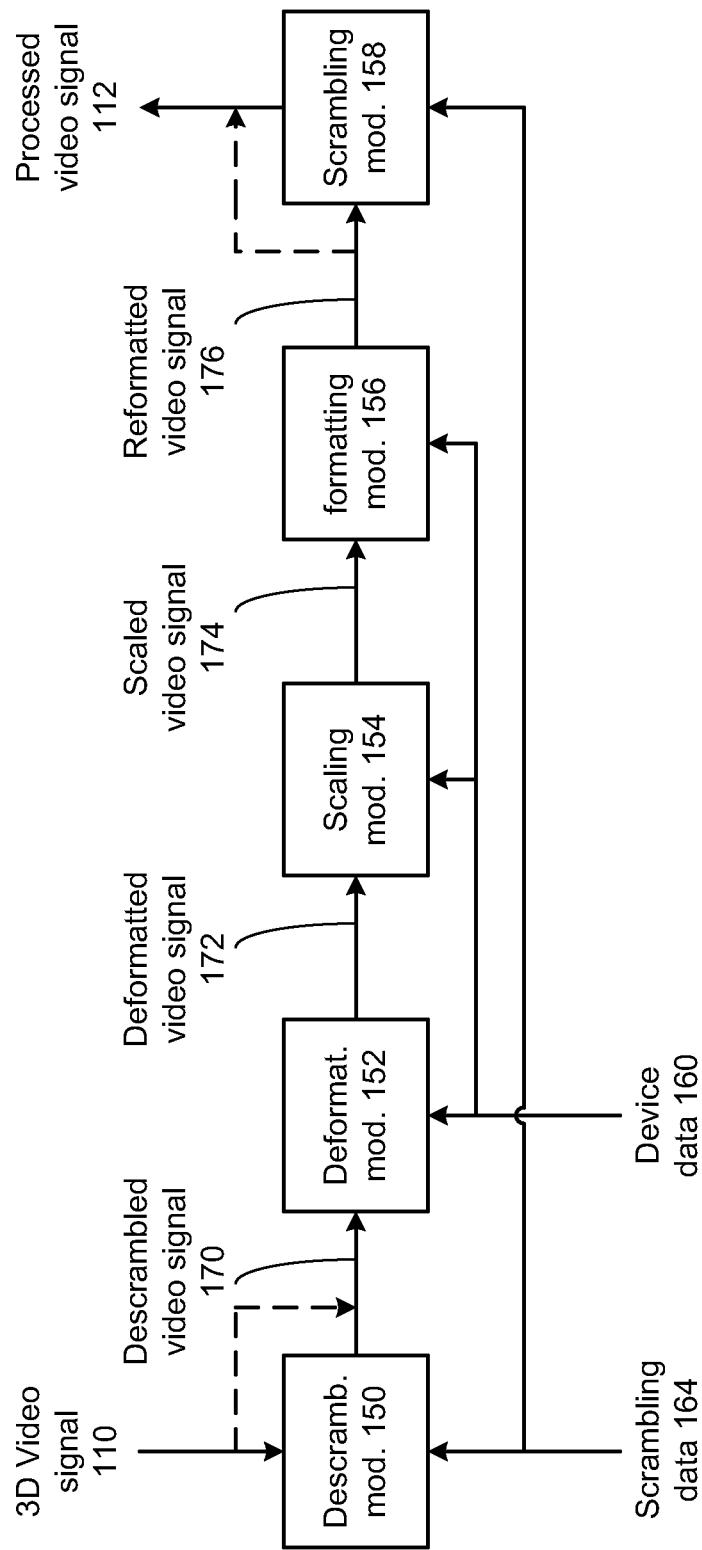
FIG. 4 presents a block diagram representation of 3D video processing in accordance with an embodiment of the present invention.

FIG. 4 presents a block diagram representation of 3D video processing in accordance with an embodiment of the present invention. In some circumstances 3D video signal 110 can be scrambled when received to protect the content from unauthorized access, for digital rights management or for other purposes via a scrambling algorithm such as an encryption algorithm operating based on a scrambling data 164 such as one or more encryption keys or other scrambling algorithm. When 3D video signal 110 is scrambled in this fashion, descrambling module 150 descrambles the 3D video signal 110 based on scrambling data 164, prior to deformatting by the deformatting module 152 to produce descrambled video signal 170.

Deformatting module 152 generates a deformatted video signal 172 directly from 3D video signal when no scrambling is used or based on descrambled video signal 170 derived from the 3D video signal 110. In particular, deformatting module 152 operates based on 3D formatting data included in device data 106 to produce deformatted video signal 172 for further processing.

For example, the deformatting module 152 operates to unwrap the 3D transport format of the 3D video format 110 and to extract the particular deformatted video signal 172 or signals required for further processing to produce the processed video signal 112 for the particular target device. In this fashion, deformatting module 152 can alternatively output only a basic video signal, such as only left or only right pictures, or both right and left picture data and some or all enhancement layers included in the 3D video signal 110 based on the desired resolution of the processed video signal 112 and also based on whether the processed video signal is a 3D video signal or only a 2D video signal.

Scaling module 154 generates a scaled video signal 174, based on the deformatted video signal 172 and further based on scaling data based included in device data 106. In particular, the scaling module 154 produces scaled video signal 174 in the compression format and in the desired resolution of the processed video signal 112. In operation, the scaling module 154 can transcode the deformatted video signal 172 from the source compression format to the target compression format and scale the video from the source video resolution to the target resolution and/or from a source frame rate to a target frame rate, as indicated by the formatting and scaling data of device data 106. Formatting module 156 generates a reformatted video signal 176 in accordance with a target video format, either 2D or 3D, based on the scaled video signal 174 and further based on the 3D formatting data 162 included in device data 106. When the processed video signal corresponds to a 3D video signal, the formatting module 156 wraps the reformatted video signal in accordance with the 3D transport format specified by the 3D formatting data of device data 106.

When the 3D video signal 110 is scrambled or otherwise a scrambled processed video signal 112 is required, the scrambling module 158 scrambles the reformatted video signal 176 based on scrambling data 164, prior to sending the reformatted video signal to the target device. Otherwise, the reformatted video signal 176 can be output as the processed data 112. In an embodiment of the present invention, the scrambling module 158 operates to scramble the reformatted video signal using the same encryption key as used to scramble the 3D video signal 110. In this fashion, the processed video signal can be descrambled by a particular video display device 104 is if it were receiving the 3D video signal 110 directly. In another embodiment of the present invention, the scrambling module 158 scrambles the reformatted video signal 176 with scrambling data 164 such as an encryption key that is particular to the video display device 104. In this fashion, the video transcoder 102 can further operate to transcrypt the 3D video signal 110 when producing the processed video signal 112. It should be noted that the scrambling data 164 can be included in device data 106 that is received from video display device 104, from some other database, or can be received from a video source 50, a certification authority or other source.

As discussed in conjunction with FIG. 2 transcoder 102 can transcode 3D video signal 110 from a particular 3D transport format into a 2D video format or another 3D transport format, while optionally scaling the video to a different resolution or modifying the video compression format from a source compression format of 3D video signal 110 to a different video compression format compatible with the video display device 104. Further, the transcoder 102 can transcode 3D video signal 110 to optionally scale the video to a different resolution, or frame rate while maintaining the 3D transport format. The operation of video transcoder 102 can be further described in conjunction with the examples of such operation presented in conjunction with FIGS. 5-12.

Figure 5:
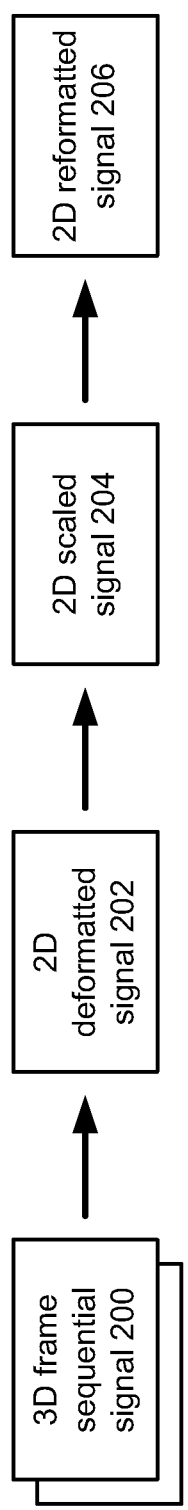
FIG. 5 presents a data flow representation of 3D video processing in accordance with an embodiment of the present invention.

FIG. 5 presents a data flow representation of 3D video processing in accordance with an embodiment of the present invention. In this example, the video transcoder 102 operates to transcode a 3D frame sequential signal 200, such as an MVC 1080i signal into a 2D lower resolution signal such as a H.264 compressed 480i signal. The deformatting module 152 generates the deformatted video signal 172 as a two-dimensional deformatted signal. In particular, the deformatting module 152 operates to unwrap the MVC 3D transport format and extract a single basic signal, such as right or left picture views, as a single 2D deformatted signal 202. The scaling module 154 generates the scaled video signal 174 as a two-dimensional scaled signal 204 by downscaling the right or left picture views to 480i resolution. The reformatting module 156 generates the reformatted video signal 176 as a two-dimensional reformatted video signal 206 formatted in H.264.

Figure 6:
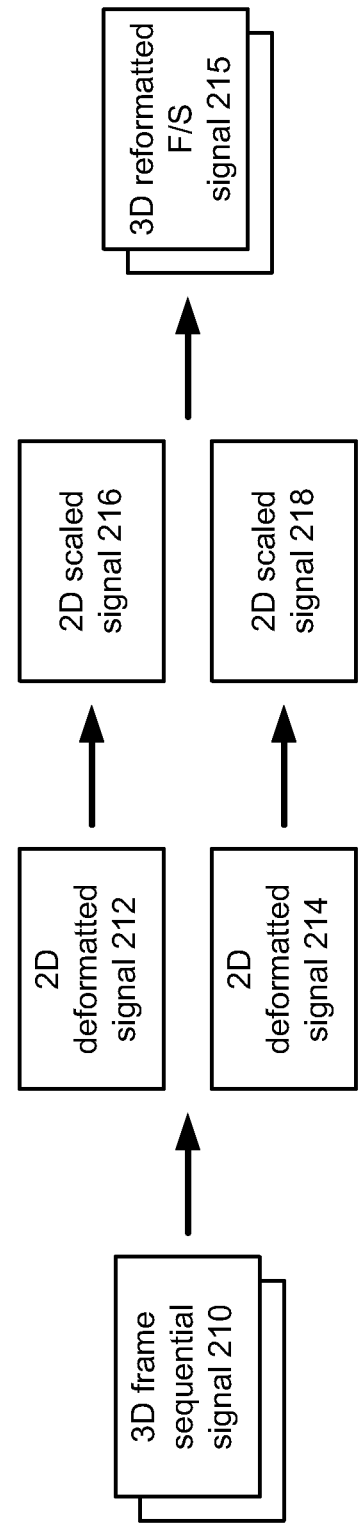
FIG. 6 presents a data flow representation of 3D video processing in accordance with an embodiment of the present invention.

FIG. 6 presents a data flow representation of 3D video processing in accordance with an embodiment of the present invention. In this example, the video transcoder 102 operates to transcode a 3D frame sequential signal 210, such as an MVC 1080i signal into a 3D lower resolution signal such as a Blu-ray 3D signal. The deformatting module 152 generates the deformatted video signal 172 as a two two-dimensional deformatted signals. In particular, the deformatting module 152 operates to unwrap the MVC 3D transport format and extract both right and left picture views, as a two 2D deformatted signal 212 and 214. The scaling module 154 generates the scaled video signal 174 as two two-dimensional scaled signals 216 and 218 by downscaling the right and left picture views from 1080i at 50/60 Hz frame rates to two 1080p resolution signals at 24 Hz frame rates. The reformatting module 156 generates the reformatted video signal 176 as a three-dimensional reformatted frame sequential video signal 215 formatted in MVC 3D transport format.

Figure 7:
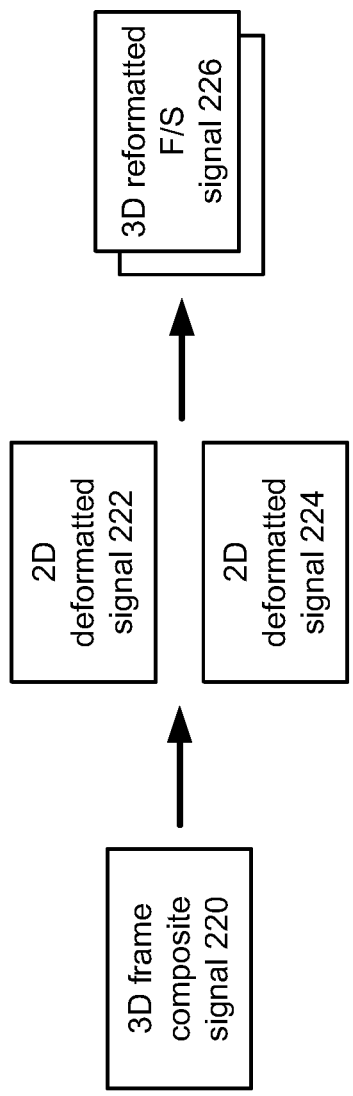
FIG. 7 presents a data flow representation of 3D video processing in accordance with an embodiment of the present invention.

FIG. 7 presents a data flow representation of 3D video processing in accordance with an embodiment of the present invention. In this example, the video transcoder 102 operates to transcode a 3D frame composite signal 220, such as a top-bottom composite 720p signal into a 3D MVC signal. The deformatting module 152 generates the deformatted video signal 172 as two two-dimensional deformatted signals. In particular, the deformatting module 152 operates to unwrap the top-bottom frame composite 3D transport format and extract both right and left picture views, as a two 2D deformatted signal 222 and 224. The reformatting module 156 operates to directly generate the reformatted video signal 176 from the extracted right and left picture views as a three-dimensional reformatted frame sequential video signal 226 formatted in the MVC 3D transport format.

Figure 8:
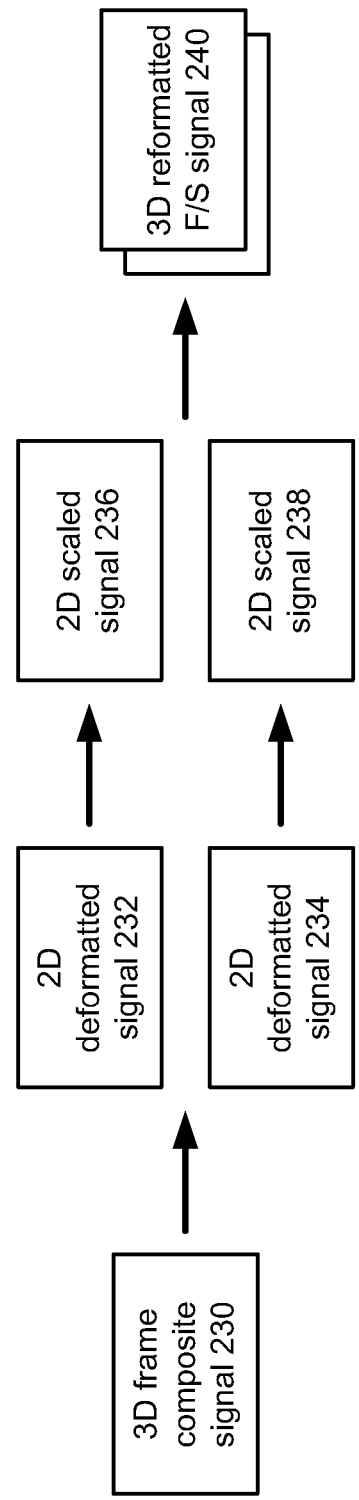
FIG. 8 presents a data flow representation of 3D video processing in accordance with an embodiment of the present invention.

FIG. 8 presents a data flow representation of 3D video processing in accordance with an embodiment of the present invention. In this example, the video transcoder 102 operates to transcode a 3D frame composite signal 230, such as a side-side composite signal into a lower resolution 3D MVC signal. The deformatting module 152 generates the deformatted video signal 172 as two two-dimensional deformatted signals. In particular, the deformatting module 152 operates to unwrap the side-side frame composite 3D transport format and extract both right and left picture views, as a two 2D deformatted signal 232 and 234. The scaling module 154 generates the scaled video signal 174 as two two-dimensional scaled signals 236 and 238 by downscaling the right and left picture views from the effective source resolution and/or frame rate of each signal into the target resolution and/or frame rate. The reformatting module 156 generates the reformatted video signal 176 as a three-dimensional reformatted frame sequential video signal 240 formatted in the MVC 3D transport format.

Figure 9:
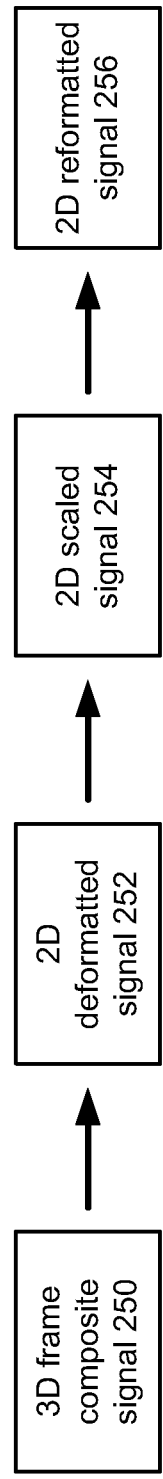
FIG. 9 presents a data flow representation of 3D video processing in accordance with an embodiment of the present invention.

FIG. 9 presents a data flow representation of 3D video processing in accordance with an embodiment of the present invention. In this example, the video transcoder 102 operates to transcode a 3D frame composite signal 250 into a 2D lower resolution H.264 signal. The deformatting module 152 generates the deformatted video signal 172 as a two-dimensional deformatted signal. In particular, the deformatting module 152 operates to unwrap the 3D transport format and extract a single basic signal, such as right or left picture views, as a single 2D deformatted signal 252. The scaling module 154 generates the scaled video signal 174 as a two-dimensional scaled signal 254 by downscaling the right or left picture views to a lower target resolution. The reformatting module 156 generates the reformatted video signal 176 as a two-dimensional reformatted video signal 256 formatted in H.264.

Figure 10:
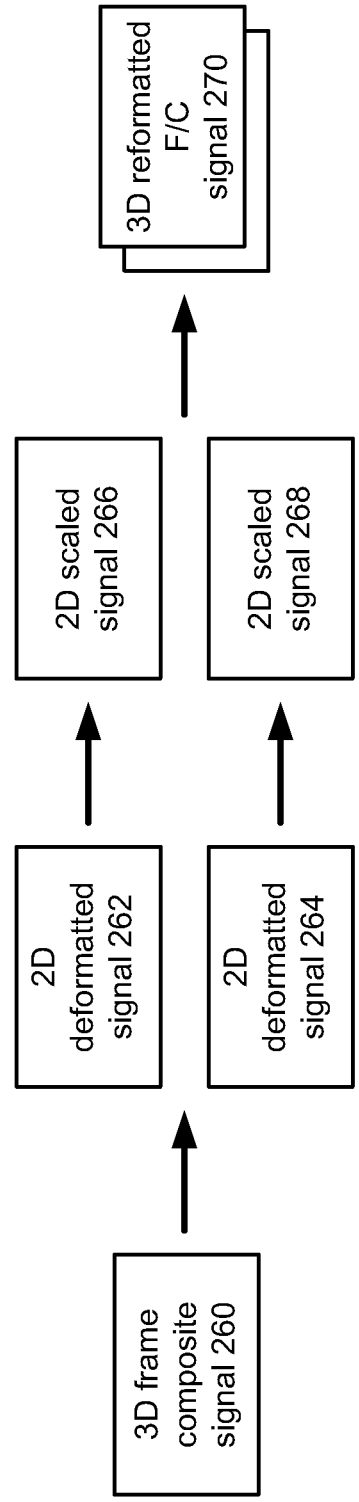
FIG. 10 presents a data flow representation of 3D video processing in accordance with an embodiment of the present invention.

FIG. 10 presents a data flow representation of 3D video processing in accordance with an embodiment of the present invention. In this example, the video transcoder 102 operates to transcode a 3D frame composite signal 260, such as a line interleaved signal into a 3D lower resolution signal such as a lower resolution line interleaved signal. The deformatting module 152 generates the deformatted video signal 172 as a two two-dimensional deformatted signals. In particular, the deformatting module 152 operates to unwrap the line interleaved 3D transport format and extract both right and left picture views, as a two 2D deformatted signal 262 and 264. The scaling module 154 generates the scaled video signal 174 as two two-dimensional scaled signals 266 and 268 by downscaling the right and left picture views from the source rate and/or resolution to two lower rate and/or lower resolution signals. The reformatting module 156 generates the reformatted video signal 176 as a three-dimensional reformatted frame composite video signal 270 formatted in line interleaved 3D transport format.

Figure 11:
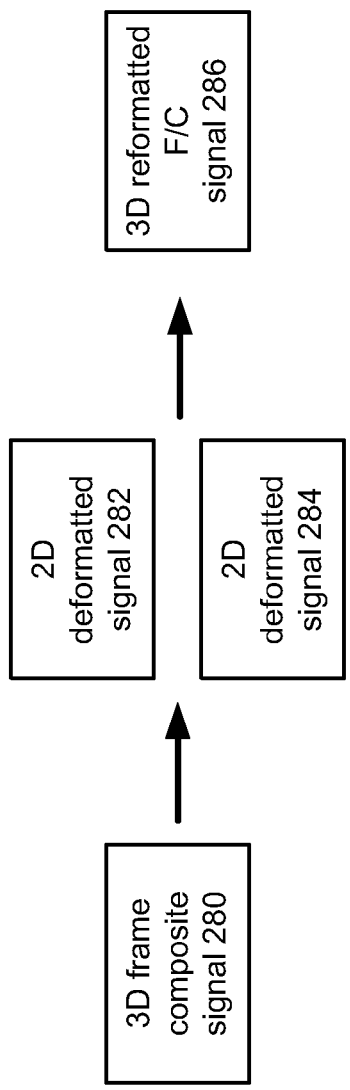
FIG. 11 presents a data flow representation of 3D video processing in accordance with an embodiment of the present invention.

FIG. 11 presents a data flow representation of 3D video processing in accordance with an embodiment of the present invention. In this example, the video transcoder 102 operates to transcode a 3D frame composite signal 280, such as a line interleaved composite 1080i signal into a checkerboard 1080i signal. The deformatting module 152 generates the deformatted video signal 172 as two two-dimensional deformatted signals. In particular, the deformatting module 152 operates to unwrap the top-bottom frame composite 3D transport format and extract both right and left picture views, as a two 2D deformatted signal 282 and 284. The reformatting module 156 operates to directly generate the reformatted video signal 176 from the extracted right and left picture views as a three-dimensional reformatted frame composite video signal 286 formatted in the checkerboard 3D transport format.

Figure 12:
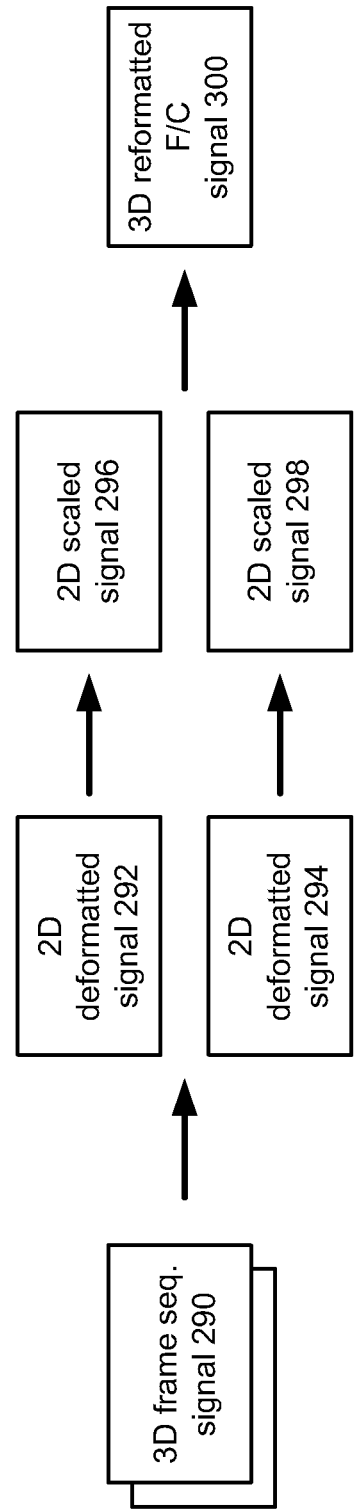
FIG. 12 presents a data flow representation of 3D video processing in accordance with an embodiment of the present invention.

FIG. 12 presents a data flow representation of 3D video processing in accordance with an embodiment of the present invention. In this example, the video transcoder 102 operates to transcode a 3D frame sequential signal 290, such as an MVC 3D signal into a lower resolution 3D frame composite signal, such as a top-bottom composite signal. The deformatting module 152 generates the deformatted video signal 172 as two two-dimensional deformatted signals. In particular, the deformatting module 152 operates to unwrap the MVC 3D transport format and extract both right and left picture views, as a two 2D deformatted signal 292 and 294. The scaling module 154 generates the scaled video signal 174 as two two-dimensional scaled signals 296 and 298 by downscaling the right and left picture views from the effective source resolution and/or frame rate of each signal into the target resolution and/or frame rate. The reformatting module 156 generates the reformatted video signal 176 as a three-dimensional reformatted frame composite video signal 300 formatted in the top-bottom composite 3D transport format.

Figure 13:
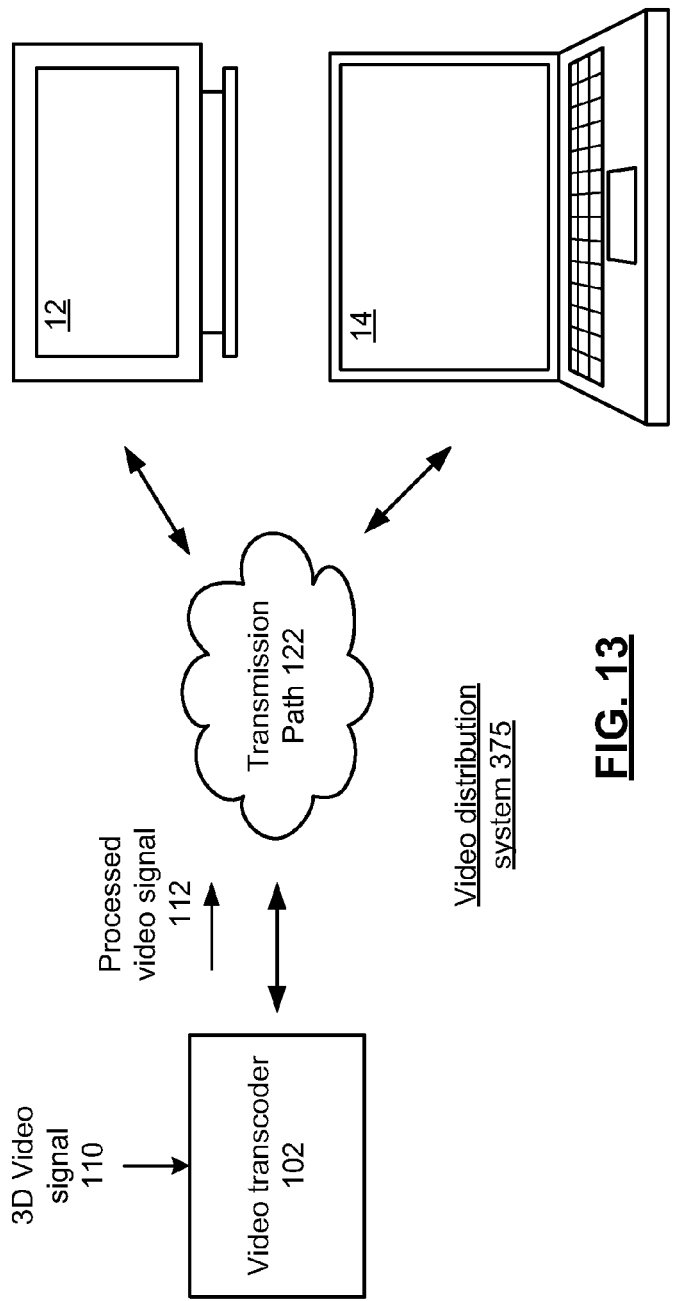
FIG. 13 presents a block diagram representation of a video distribution system 375 in accordance with an embodiment of the present invention.

FIG. 13 presents a block diagram representation of a video distribution system 375 in accordance with an embodiment of the present invention. In particular, 3D video signal 110 transcoded via video transcoder 102 into a processed video signal 112 that is transmitted via a transmission path 122 display on a video display devices such as television or monitor 12 or personal computer 14 or other display device. In an embodiment of the present invention, video transcoder 102 can be implemented in a set-top box, digital video recorder, router or home gateway.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 14:
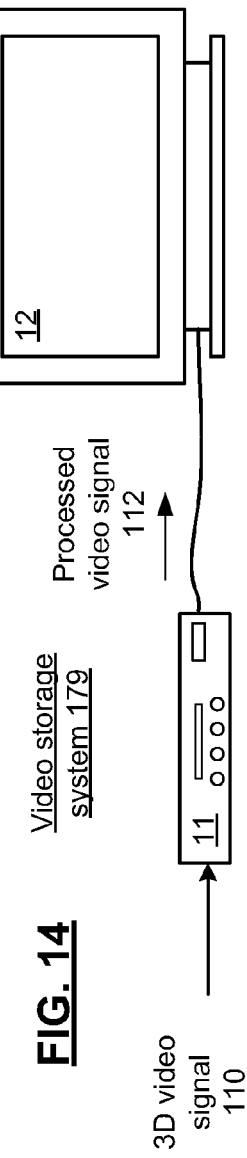
FIG. 14 presents a block diagram representation of a video storage system 179 in accordance with an embodiment of the present invention.

FIG. 14 presents a block diagram representation of a video storage system 179 in accordance with an embodiment of the present invention. In particular, device 11 is a set top box with built-in digital video recorder functionality, a stand alone digital video recorder, a DVD recorder/player or other device that receives the 3D video signal 110. In this configuration, device 11 can include video transcoder 102 that operates to transcode the 3D video signal 110 either prior to storage or when retrieved from storage to generate a processed video signal 112 in a format that is suitable for display by video display device 12. While these particular devices are illustrated, video storage system 179 can include a hard drive, flash memory device, computer, DVD burner, or any other device that is capable of generating, storing, decoding, transcoding and/or displaying the video content of 3D video signal 110 in accordance with the methods and systems described in conjunction with the features and functions of the present invention as described herein.

Figure 15:
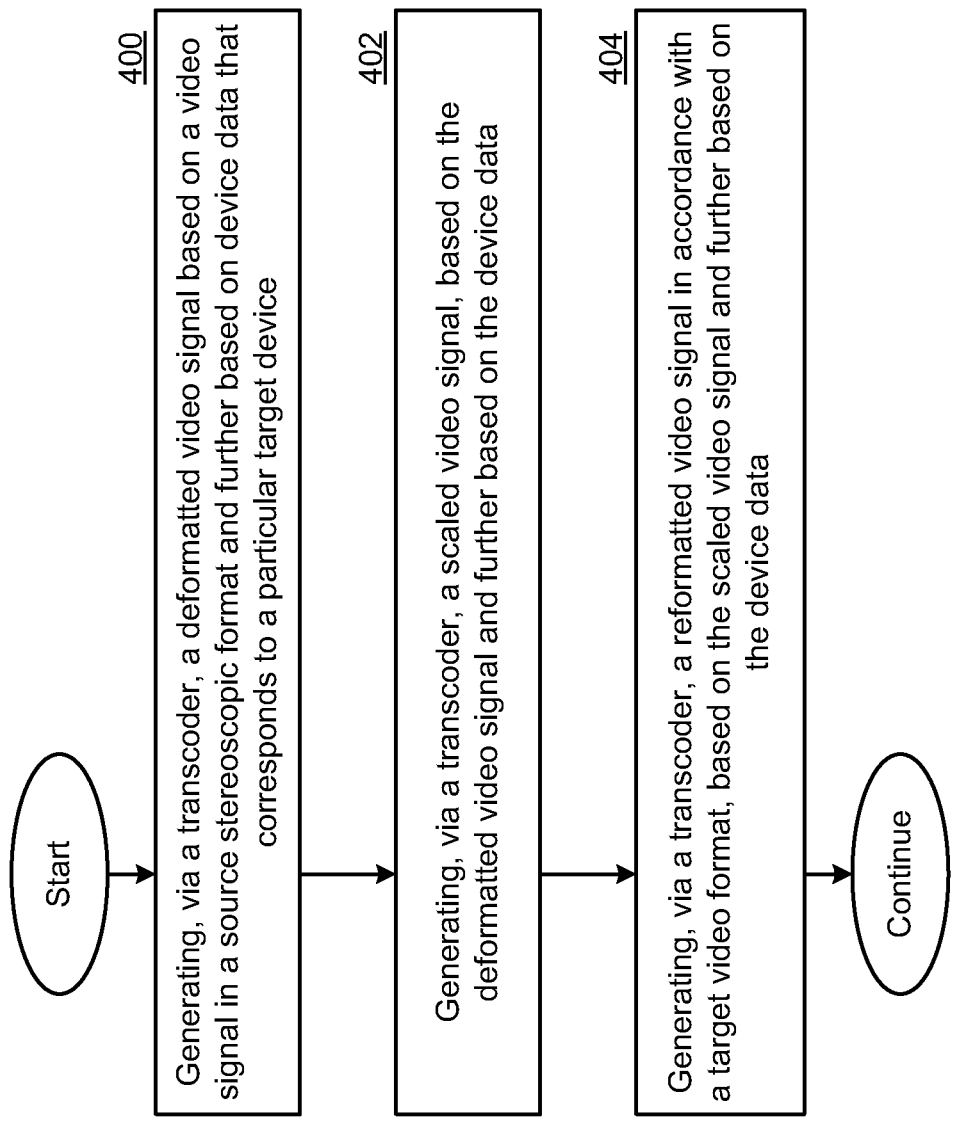
FIG. 15 presents a flow diagram representation of a method in accordance with an embodiment of the present invention.

FIG. 15 presents a block diagram representation of a method in accordance with an embodiment of the present invention. In particular, a method is presented for use in conjunction with one or more functions and features described in conjunction with FIGS. 1-4. In step 400, a deformatted video signal is generated, via a video transcoder, based on a video signal in a source stereoscopic video format, and further based on device data that corresponds to a particular target device. In step 402, a scaled video signal is generated via a video transcoder, based on the deformatted video signal and further based on the device data. In step 404, a reformatted video signal is generated via a video transcoder in accordance with a target video format, based on the scaled video signal and further based on the device data.

In an embodiment of the present invention, the device data indicates the target video format and a target video resolution and wherein the video transcoder generates the scaled video signal by scaling the deformatted video signal from a source resolution to the target video resolution. The source stereoscopic video format can be a frame sequential stereoscopic format, step 400 can generates the deformatted video signal as a two-dimensional deformatted signal, step 402 can generate the scaled video signal as a two-dimensional scaled signal, and step 404 can generate the reformatted video signal as a two-dimensional reformatted video signal.

The target video format can be a stereoscopic frame sequential video format or a stereoscopic frame composite video format. The source stereoscopic video format can also be a stereoscopic frame sequential video format or a stereoscopic frame composite video format.

In an embodiment of the present invention, the video transcoder can generates the deformatted video signal in step 400 as a plurality of two-dimensional deformatted signals, generates the scaled video signal in step 402 as a plurality of two-dimensional scaled signals, and generates the reformatted video signal in step 404 as a stereoscopic reformatted video signal. Step 400 can include descrambling the video signal based on scrambling data. Step 404 can include scrambling or rescrambling the reformatted video signal.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more module functions such as the processing of an input signal to produce an output signal. As used herein, a module may contain submodules that themselves are modules.

Thus, there has been described herein an apparatus and method, as well as several embodiments including a preferred embodiment, for implementing a video transcoder. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A video transcoder comprising:
   a descrambling module that descrambles a 3D video signal based on scrambling data;
   a deformatting module, coupled to the descrambling module, that generates a deformatted video signal by unwrapping the 3D video signal in a source stereoscopic video format, based on device data that corresponds to a particular target device, to extract right and left picture views from the 3D video signal;
   a scaling module, coupled to the deformatting module, that downscales the right and left picture views from a source resolution and frame rate into a scaled video signal having a target resolution and frame rate of the particular target device;
   a reformatting module, coupled to the scaling module, that generates a reformatted video signal in accordance with a target video format by re-wrapping the scaled video signal, based on the scaled video signal and further based on the device data, wherein the target video format is one of: a stereoscopic frame sequential video format; and a stereoscopic frame composite video format; and
   a scrambling module, coupled to the reformatting module, that scrambles the reformatted video signal based on scrambling data prior to sending the reformatted video signal to the particular target device.

2. The video transcoder of claim 1 wherein the device data indicates the target video resolution.

3. The video transcoder of claim 1 wherein when the source stereoscopic video format is a frame sequential stereoscopic format, the deformatting module generates the deformatted video signal as a two-dimensional deformatted signal, and the scaling module generates the scaled video signal as a two-dimensional scaled signal.

4. The video transcoder of claim 1 wherein the source stereoscopic video format is one of: a stereoscopic frame sequential video format; and a stereoscopic frame composite video format.

5. The video transcoder of claim 1 wherein the deformatting module generates the deformatted video signal as a plurality of two-dimensional deformatted signals, the scaling module generates the scaled video signal as a plurality of two-dimensional scaled signals, and the reformatting module generates the reformatted video signal as a stereoscopic reformatted video signal.

6. A method comprising:
   descrambling a 3D video signal based on scrambling data;
   generating, via a video transcoder, a deformatted video signal by unwrapping the 3D video signal in a source stereoscopic video format, based on device data that corresponds to a particular target device, to extract right and left picture views from the 3D video signal;
   downscaling, via the video transcoder, the right and left picture views from a source resolution and frame rate into a scaled video signal having a target resolution and frame rate of the particular target device;
   generating, via the video transcoder, a reformatted video signal in accordance with a target video format by re-wrapping the scaled video signal, based on the scaled video signal and further based on the device data, wherein the target video format is one of: a stereoscopic frame sequential video format; and a stereoscopic frame composite video format; and
   scrambling the reformatted video signal based on scrambling data prior to sending the reformatted video signal to the particular target device.

7. The method of claim 6 wherein the device data indicates the target video format and a target video resolution.

8. The method of claim 6 wherein the source stereoscopic video format is a frame sequential stereoscopic format, the video transcoder generates the deformatted video signal as a two-dimensional deformatted signal, and generates the scaled video signal as a two-dimensional scaled signal.

9. The method of claim 6 wherein the source stereoscopic video format is one of: a stereoscopic frame sequential video format; and a stereoscopic frame composite video format.

10. The method of claim 6 wherein the video transcoder generates the deformatted video signal as a plurality of two-dimensional deformatted signals, generates the scaled video signal as a plurality of two-dimensional scaled signals, and generates the reformatted video signal as a stereoscopic reformatted video signal.

* * * * *